(12) United States Patent
Madasu et al.

(10) Patent No.: US 11,396,804 B2
(45) Date of Patent: Jul. 26, 2022

(54) AUTOMATED RATE OF PENETRATION OPTIMIZATION FOR DRILLING

(71) Applicant: Landmark Graphics Corporation, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 16/617,591

(22) PCT Filed: Aug. 30, 2018

(86) PCT No.: PCT/US2018/048937
§ 371 (c)(1),
(2) Date: Nov. 27, 2019

(87) PCT Pub. No.: WO2020/046351
PCT Pub. Date: Mar. 5, 2020

(65) Prior Publication Data
US 2021/0324723 A1 Oct. 21, 2021

(51) Int. Cl.
*E21B 44/02* (2006.01)
*E21B 45/00* (2006.01)
(Continued)

(52) U.S. Cl.
CPC .............. *E21B 44/02* (2013.01); *E21B 44/00* (2013.01); *E21B 45/00* (2013.01); *G05B 13/027* (2013.01); *E21B 2200/22* (2020.05)

(58) Field of Classification Search
CPC ........ E21B 44/00; E21B 44/005; E21B 44/02; E21B 44/04; E21B 44/10; E21B 45/00; E21B 2200/20; E21B 2200/22
See application file for complete search history.

(56) References Cited

U.S. PATENT DOCUMENTS 6,732,052 B2  5/2004 Macdonald et al.
9,482,084 B2  11/2016 Chang et al.
(Continued)

FOREIGN PATENT DOCUMENTS

EP  2090742 A1  2/2008
WO  WO 2016/160005 A1  10/2016

OTHER PUBLICATIONS

Berkenkamp et al., "Bayesian Optimization with Safety Constraints: Safe and Automatic Parameter Tuning in Robotics," 2016.
(Continued)

*Primary Examiner* — Tara Schimpf
(74) *Attorney, Agent, or Firm* — Haynes and Boone, LLP

(57) ABSTRACT

Systems and methods for controlling drilling operations are provided. A controller for a drilling system may provide drilling parameters such as weight-on-bit and rotation rate parameters to the drilling system, based on a machine-learned reward policy and a model-based prediction. The machine-learned reward policy may be generated during drilling operations and used to modify recommended values from the model-based prediction for subsequent drilling operations to achieve a desired rate-of-penetration.

20 Claims, 11 Drawing Sheets

(51) Int. Cl.
*G05B 13/02* (2006.01)
*E21B 44/00* (2006.01)

(56) References Cited

U.S. PATENT DOCUMENTS

| | | | |
|---|---|---|---|
| 2002/0120401 A1* | 8/2002 | Macdonald | E21B 44/005 |
| | | | 702/6 |
| 2004/0124012 A1* | 7/2004 | Dunlop | E21B 44/00 |
| | | | 175/57 |
| 2004/0256152 A1 | 12/2004 | Dashevskiy et al. | |
| 2010/0108384 A1 | 5/2010 | Byreddy et al. | |
| 2011/0232968 A1 | 9/2011 | Purwanto et al. | |
| 2014/0049401 A1 | 2/2014 | Tang et al. | |
| 2015/0081222 A1 | 3/2015 | Laing et al. | |
| 2015/0100530 A1* | 4/2015 | Mnih | A63F 13/67 |
| | | | 706/25 |
| 2015/0247396 A1 | 9/2015 | Tunc et al. | |
| 2017/0096889 A1 | 4/2017 | Blanckaert et al. | |
| 2017/0328181 A1 | 11/2017 | Kristjansson et al. | |
| 2018/0135401 A1* | 5/2018 | Dykstra | E21B 7/04 |
| 2019/0310115 A1* | 10/2019 | Abe | G06N 3/08 |

OTHER PUBLICATIONS

Dunlop et al., "Optimizing ROP Through Automation," *Drilling Contractor*, Sep./Oct. 2011.
International Search Report and Written Opinion issued for International Patent Application No. PCT/US2018/048937, dated Jun. 3, 2019, 9 pages.
Jacinto, et al., "Optimization Models and Prediction of Drilling Rate (ROP) for the Brazilian Pre-Salt Layer," *Chemical Engineering Transactions*, vol. 33, 2013.
Snoek et al., "Scalable Bayesian Optimization Using Deep Neural Networks," *Proceedings of the 32$^{nd}$ International Conference on Machine Learning*, Lille, France, 2015.

* cited by examiner

US 11,396,804 B2

AUTOMATED RATE OF PENETRATION OPTIMIZATION FOR DRILLING

CROSS REFERENCE TO RELATED APPLICATIONS

The present application is a U.S. National Stage patent application of International Patent Application No. PCT/US2018/048937, filed on Aug. 30, 2018, the benefit of which is claimed and the disclosure of which is incorporated herein by reference in its entirety.

TECHNICAL FIELD

The present disclosure relates generally to well planning and control during drilling operations and more particularly, for example, to automated rate of penetration optimization for drilling using reinforcement learning.

BACKGROUND OF THE DISCLOSURE

To obtain hydrocarbons, such as oil and gas, a wellbore is drilled into a hydrocarbon bearing rock formation by rotating a drill bit attached to a drill string. The drill bit is mounted on the lower end of the drill string as part of a bottom hole assembly (BHA) and is rotated by rotating the drill string at the surface, by actuation of a downhole motor, or both. With weight applied by the drill string, the rotating drill bit engages the formation and forms a borehole toward a target zone. During the drilling process, drilling fluids are circulated to clean the cuttings while the drill bit is penetrated through the formation.

A number of sensors or measurement devices may be placed in close proximity to the drill bit to measure downhole operating parameters associated with the drilling and downhole conditions. The measurements captured by such sensors may be transmitted to a computing device of a drilling operator at the surface of the borehole for purposes of monitoring and controlling the drilling of the wellbore along a planned path over different stages of a drilling operation. When making decisions for effectively planning and implementing a well plan, the drilling operator may need to constantly monitor and adjust various parameters to account for changes in downhole conditions as the wellbore is drilled through different layers of the formation. However, this may prove to be difficult due to the complexity of the underlying physics and engineering aspects of the drilling process in addition to the inherent uncertainty of the data captured at the surface and downhole.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
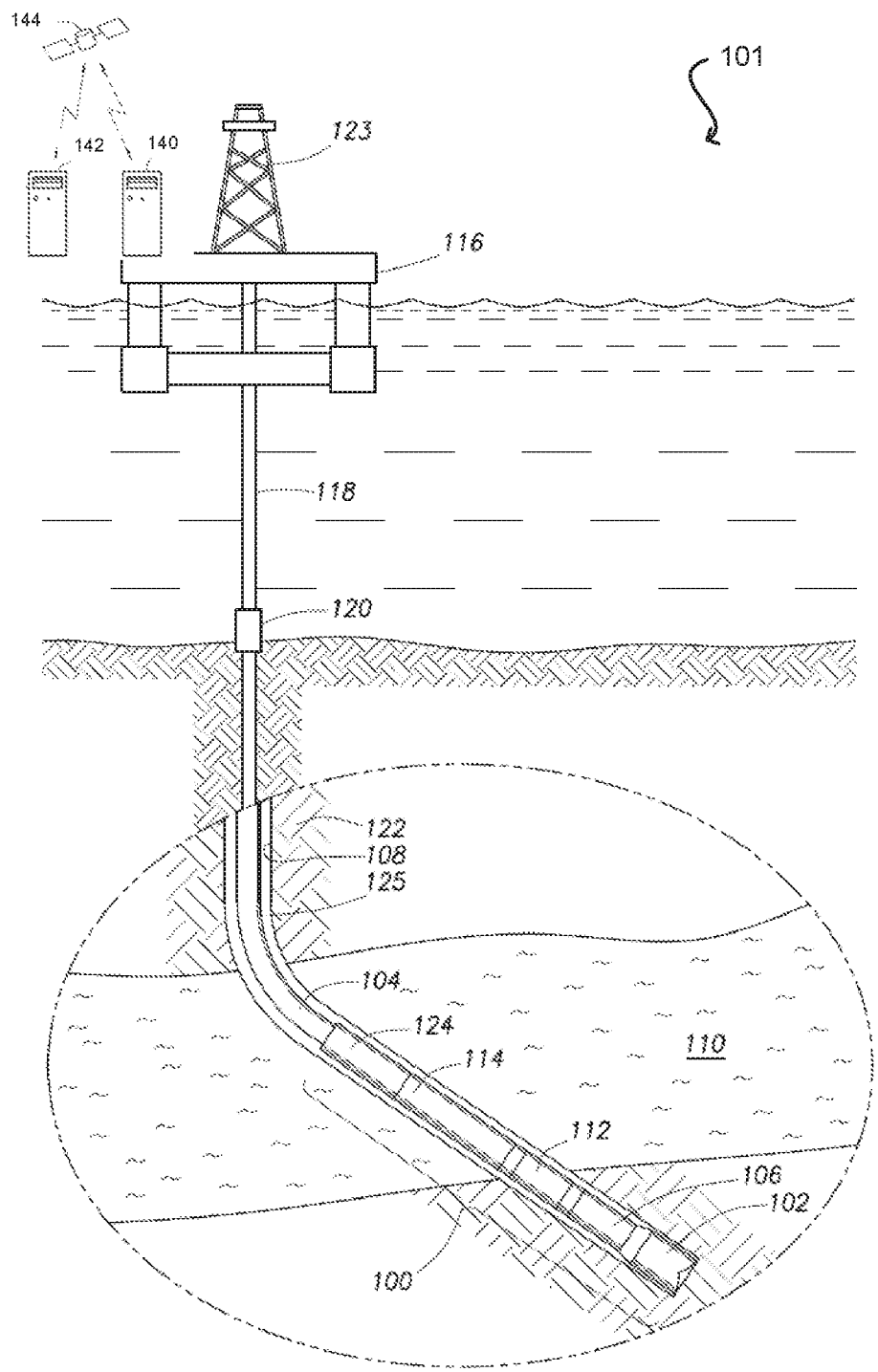
FIG. 1 is a diagram of an offshore drilling system in accordance with some implementations.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure relates to systems and methods for controlling drilling operations.

A drilling operation may involve drilling a wellbore along a planned path or trajectory through different layers of a subsurface formation. Downhole operating conditions may change while the wellbore is drilled through the formation. As a result, a drilling operator or robotic controller may continuously adjust one or more controllable parameters to account for such changes and thereby maintain or improve drilling efficiency during the operation. Examples of such controllable parameters include, but are not limited to, weight-on-bit (WOB), rotation rate of the drill bit or drill string (e.g., rotational rate applied by the top drive unit) in revolutions per minute (RPM), and an injection or pumping rate (IR) of drilling fluid into the wellbore or pipe disposed therein. Although "RPM" is sometimes used herein to refer to drill bit rotation or rotation rate, it should be appreciated that such a rotation rate may be specified using any appropriate unit of measure as desired for a particular implementation.

In one or more embodiments, the controllable parameters may be used to control values of an "operating variable" of the drilling operation as it is performed downhole over different stages along a planned path of the wellbore through the formation. The operating variable may be used to monitor a particular downhole response as the drilling operation is performed along the well path (e.g., according to current values of the controllable parameters or input variables). Accordingly, the operating variable may also be referred to herein as a "response variable" of the drilling operation. Examples of such operating/response variables include, but are not limited to, mechanical specific energy (MSE), hydraulic mechanical specific energy (HMSE), and/or rate of penetration (ROP). The controllable parameters are sometimes referred to herein as "drilling parameters."

Recommended drilling parameters may be provided by a model-based prediction engine that includes a model that parameterizes known information about a reservoir and/or a drilling system. However, environmental factors that are not known to the model can cause a drilling system's response (e.g., a resulting ROP) to differ from the ROP that is recommended by the prediction engine and expected based on an application of associated recommended drilling parameters.

In accordance with aspects of the disclosure, a controller for a drilling system may provide with drilling parameters such as weight-on-bit and rotation rate parameters to the drilling system, based on a machine-learned reward policy and a model-based prediction. The machine-learned reward policy may be generated during prior drilling operations and used to modify recommended values from the model-based prediction for subsequent drilling operations to achieve a desired rate-of-penetration. In this way, the system may iteratively control the drill bit and adjust the drilling parameters to increase drilling efficiency (e.g., by maximizing ROP and/or minimizing HMSE).

Although various examples are described herein in the context of predicting and optimizing ROP, it should be noted that the disclosure is not intended to be limited thereto and that the disclosed drilling control operations using machine-learned reward policies may be applied to any of various operating variables as desired for a particular implementation.

FIG. 1 is a diagram showing an example of a drilling system 101, implemented as an offshore drilling system (e.g., for a subsea drilling operation). In particular, FIG. 1 shows a bottomhole assembly 100 for a subsea drilling operation, where the bottomhole assembly 100 illustratively comprises a drill bit 102 on the distal end of the drill string 104. Various logging-while-drilling (LWD) and measuring-while-drilling (MWD) tools may also be coupled within the bottomhole assembly 100. The distinction between LWD and MWD is sometimes blurred in the industry, but for purposes of this specification and claims LWD tools measure properties of the surrounding formation (e.g., resistivity, porosity, permeability), and MWD tools measure properties associated with the borehole (e.g., inclination, and direction). In the example system, a logging tool 106 may be coupled just above the drill bit, where the logging tool may read data associated with the borehole 108 (e.g., MWD tool), or the logging tool 106 may read data associated with the surrounding formation (e.g., a LWD tool). In some cases, the bottomhole assembly 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114.

The bottomhole assembly 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to rotate at a rotation rate (sometimes denoted RPM herein as noted above) to form the borehole 108 through the formation material 122. The weight of the drill string 104 on drill bit 102 may be controlled by drilling equipment supported within and around derrick 123 to set a weight-on-bit for the drill bit. A rate-of-penetration (ROP) of the drill bit into the formation material may depend on the rotation rate and weight-on-bit of the drill bit and based on environmental factors (e.g., characteristics of the formation local to the drill bit) not known to the drilling system. The volume defined between the drill string 104 and the borehole 108 is referred to as the annulus 125. The borehole 108 penetrates subterranean zones or reservoirs, such as reservoir 110, which may contain hydrocarbons in a commercially viable quantity.

The bottomhole assembly 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations). Likewise, the telemetry module 124 may receive information from the surface over one or more of the communication channels.

As shown, drilling system 101 may include a surface computer system 140 that operates in accordance with computer-executable instructions (which may be stored on a computer-readable storage medium thereof) to monitor and control the drilling operation, as will be described in further detail below. Such instructions may be used, for example, to configure the surface computer system 140 to process and decode the downhole signals received from the telemetry mode 124, to receive, store, and process surface measurements or downhole measurements such as drill bit rotation rates and weight-on-bit, and/or perform robotic control of the drill string 104 and drill bit 102 (e.g., based on stochastic optimization and/or reinforcement learning operations as described herein).

In one or more embodiments, some or all of the calculations and functions associated with the manual or automated monitoring and control of the drilling operation at the wellsite may be performed by a computer system 140 and/or a remote computer system 142 located away from the wellsite, e.g., at an operations center of an oilfield services provider. In some implementations, the functions performed by the remote computer system 142 may be based on wellsite data received from the wellsite computer system 140 via a communication network. Such a network may be, for example, a local-area, medium-area, or wide-area network, e.g., the Internet. As illustrated in the example of FIG. 1, the communication between computer system 140 and computer system 142 may be over a satellite 144 link. However, it should be appreciated that embodiments are not limited thereto and that any suitable form of communication may be used as desired for a particular implementation.

Remote computer system 142 may execute similar instructions as those described above for computer system 140 for implementing all or a portion of the above-described wellsite monitoring and control functionality (e.g., to receive, store, and process surface measurements or downhole measurements such as drill bit rotation rates and weight-on-bit, and/or perform robotic control of the drill string 104 and drill bit 102). For example, such functionality may be implemented using system 140, using, system 142, or using a combination of systems 140 and 142 such that all or portion of the wellsite control functionality may be spread amongst available computer systems.

In one or more embodiments, the robotic control functionality provided by computer system 142 and/or computer system 140 may include stochastic optimization and reinforcement learning operations, as described above and as will be described in further detail below with respect to FIGS. 3-11.

Figure 2:
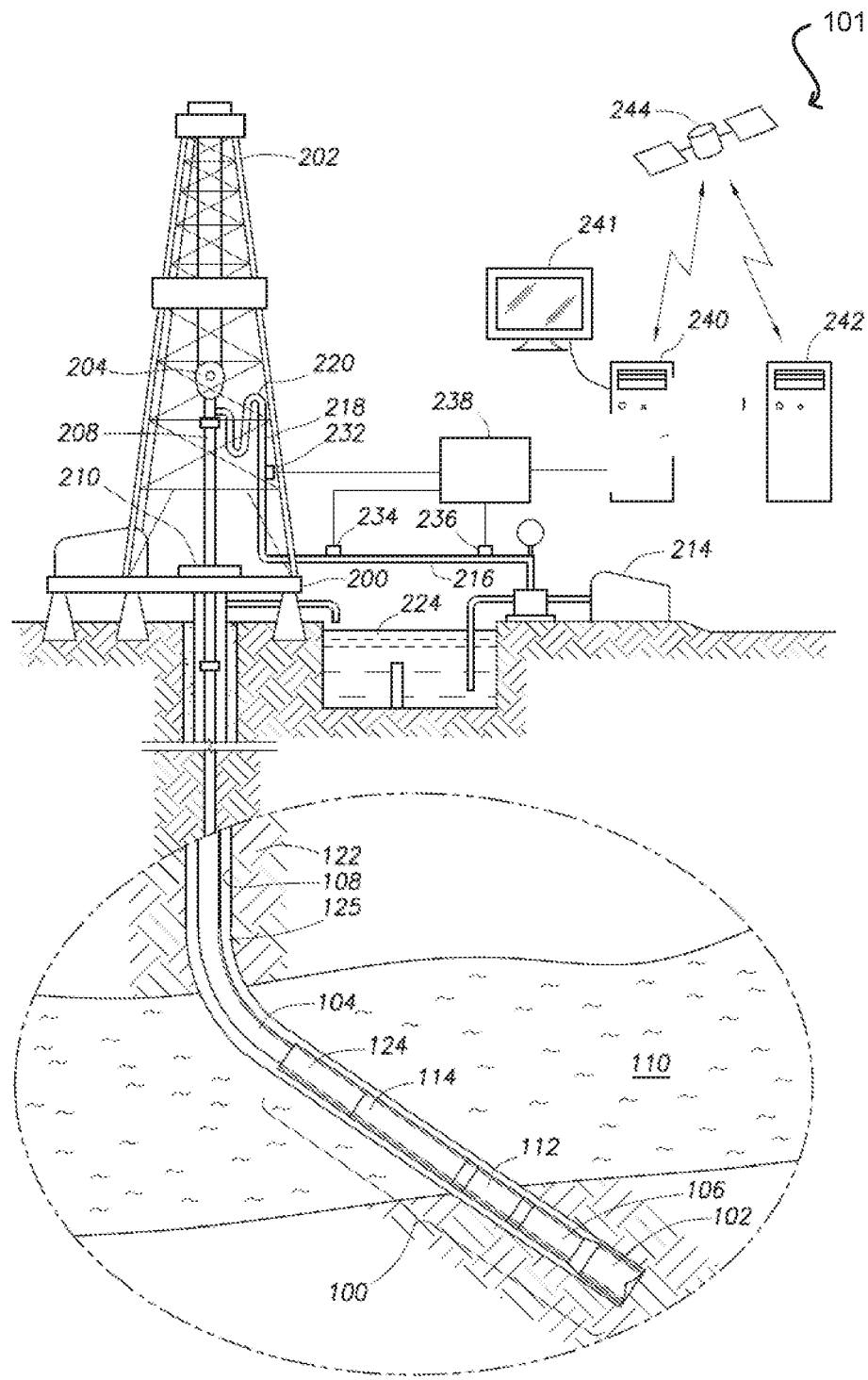
FIG. 2 is a diagram of an onshore drilling system in accordance with some implementations.

FIG. 2 is a diagram showing drilling system 101 implemented as an onshore drilling system for performing a land-based drilling operation. In particular, FIG. 2 shows a drilling platform 200 equipped with a derrick 202 that supports a hoist 204. The hoist 204 suspends a top drive 208, the hoist 204 and top drive 208 rotate and lower the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the borehole to the surface, and to balance the hydrostatic pressure in the rock formations.

Drilling equipment supported within and around derrick 202 may rotate the drill string 104, and the rotational motion of the drill string 104 and/or the rotational motion created by the mud motor 112 causes the bit 102 to rotate at a rotation rate RPM to form the borehole 108 through the formation material 122. The weight of the drill string 104 on drill bit 102 may be controlled by drilling equipment supported within and around derrick 123 to set a weight-on-bit for the drill bit. A rate-of-penetration (ROP) of the drill bit into the formation material may be the result of the rotation rate and weight-on-bit of the drill bit and of environmental factors (e.g., characteristics of the formation local to the drill bit) not known to the drilling system.

As shown, drilling system 101 may include a surface computer system 240 that operates in accordance with computer-executable instructions (which may be stored on a computer-readable storage medium thereof) to monitor and control the drilling operation, as will be described in further detail below. Such instructions may be used, for example, to configure the surface computer system 240 to process and decode the downhole signals received from the telemetry mode 124 via digitizer 238, to receive, store, and process surface measurements or downhole measurements such as drill bit rotation rates and weight-on-bit, and/or perform robotic control of the drill string 104 and drill bit 102 (e.g., based on stochastic optimization and/or reinforcement learning operations as described herein).

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite. The surface computer system 240 operates in accordance with computer-executable instructions (which may be stored on a computer-readable storage medium) to monitor and control the drilling operation, as will be described in further detail below. Such instructions may be used, for example, to configure the surface computer system 240 to process and decode the downhole signals received from the telemetry mode 124 via digitizer 238.

In one or more embodiments, real-time data collected at the wellsite, including the downhole logging data from the telemetry module 124, may be displayed on a display device 241 coupled to the computer system 240.

For example, as each stage of the drilling operation is performed and a corresponding portion of the well is drilled along its planned path, computing systems 140, 142, 240, and/or 242 may receive indications of downhole operating conditions and values of controllable parameters used to control the drilling of the well during the operation. Examples of such controllable parameters include, but are not limited to, weight-on-bit (WOB), drilling fluid injection or flow rate and pressure (within the drill pipe), rotation rate (RPM) of the drill string and/or drill bit (e.g., rotational rate applied by the top drive unit and/or a downhole motor), rate-of-penetration (ROP) and the density and viscosity of the drilling fluid. In response to receiving indications of downhole operating conditions during a current stage of the drilling operation, the surface computer system 240 may automatically send control signals to derrick 123 or 202 and/or one or more downhole devices in order to adjust the controllable parameters for subsequent stages of the operation. The control signals may include, for example, updated values of one or more controllable parameters for performing the subsequent stages of the drilling operation along the path of the well. The updated values may be generated by receiving, with a robotic controller, recommended (e.g., optimized) values of the controllable parameters and the ROP and modifying the recommended values using a machine-learned reward policy as described in further detail hereinafter.

In one or more embodiments, some or all of the calculations and functions associated with the manual or automated monitoring and control of the drilling operation at the wellsite may be performed by a computer system 240 and/or a remote computer system 242 located away from the wellsite, e.g., at an operations center of an oilfield services provider. In some implementations, the functions performed by the remote computer system 242 may be based on wellsite data received from the wellsite computer system 240 via a communication network. Such a network may be, for example, a local-area, medium-area, or wide-area network, e.g., the Internet. As illustrated in the example of FIG. 2, the communication between computer system 240 and computer system 242 may be over a satellite 244 link. However, it should be appreciated that embodiments are not limited thereto and that any suitable form of communication may be used as desired for a particular implementation.

Remote computer system 242 may execute similar instructions as those described above for computer system 240 for implementing all or a portion of the above-described wellsite monitoring and control functionality (e.g., to receive, store, and process surface measurements or downhole measurements such as drill bit rotation rates and weight-on-bit, and/or perform robotic control of the drill string 104 and drill bit 102). For example, such functionality may be implemented using system 240, using system 242, or using a combination of systems 240 and 242 such that all or portion of the wellsite control functionality may be spread amongst available computer systems.

In one or more embodiments, the robotic control functionality provided by computer system 242 and/or computer system may include stochastic optimization and reinforcement learning operations, as described above and as will be described in further detail below with respect to FIGS. 3-11.

While the examples of FIGS. 1 and 2 are described in the context of a single well and wellsite, it should be appreciated that the robotic drilling control operations disclosed herein may be applied to multiple wells at various sites throughout a hydrocarbon producing field. For example, the remote computer system 242 of FIG. 2, as described above, may be communicatively coupled via a communication network to corresponding wellsite computer systems similar to the computer system 240 of FIG. 2, as described above. The remote computer system 242 in this example may be used to continuously monitor and control drilling operations at the various wellsites by sending and receiving control signals and wellsite data to and from the respective wellsite computer systems via the network.

Although a figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Further, unless otherwise noted, even though a figure may depict a cased hole, it should be understood by those skilled in the art that the apparatus according to the present disclosure is equally well suited for use in open hole operations.

Figure 3:
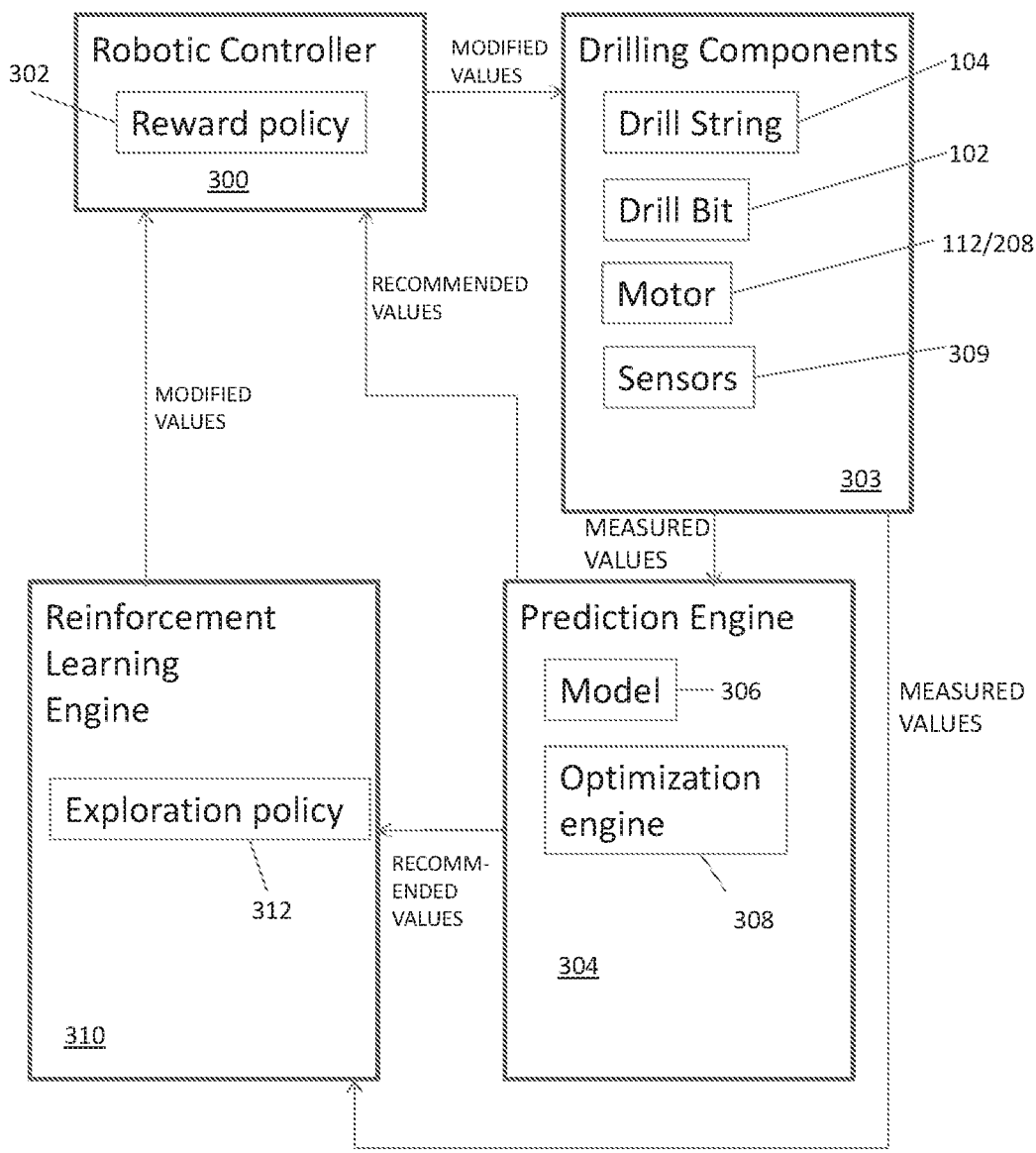
FIG. 3 is a block diagram of a system for drilling control during a drilling operation in accordance with some implementations.

FIG. 3 is a block diagram of a drill system 101 showing various components for robotic control of drilling operations in accordance with aspects of the subject disclosure. As shown in FIG. 3, drilling system 101 includes drilling components 303, previously described in connection with FIGS. 1 and 2 as including, for example, a drill string 103 operatively coupled to a drill bit 102, the drill string and/or drill bit being controllable by a motor or drive such as mud motor 112 and/or top drive 208 described herein. As shown in FIG. 3, drilling components 303 may also include one or more sensors 309 such as surface sensors and/or downhole sensors (e.g., mounted in logging tools 106 and/or 114) that provide (e.g., real-time) measured values such as measured values of the weight-on-bit, rotation rate, and/or rate-of-penetration during a drilling operation.

As shown in the FIG. 3, drilling system 101 also include a control system that includes prediction engine 304 and robotic controller 300. As shown, robotic controller 300 includes a reward policy 302. The reward policy 302 may be a machine-learned reward policy generated using reinforcement learning engine 310. Reinforcement learning engine 310, robotic controller 300, and/or prediction engine 304 may be implemented using any or all of computing systems 140, 142, 240, and/or 242 as described above.

As shown, prediction engine 304 may include a model 306 such as a neural network model that can be used, in combination with an optimization engine 308, to generate recommended (e.g., optimized) values for controllable parameters such as the WOB and rotation rate of drill bit 102, as well as a recommended (e.g., optimized) rate-of-penetration for the drill bit 102 in a formation. As described in further detail hereinafter, robotic controller 300 may receive the recommended values from optimization engine 308 and may modify the recommended values using reward policy 302 to generate control values for control of motor 112/208.

As shown in FIG. 3, reinforcement learning engine 310 may include an exploration policy 312 and/or other features of a reinforcement learning process for generation of the reward policy 302 using measured and recommended values from drilling components 303 and prediction engine 304.

Prediction operations for generation of recommended values by prediction engine 304 are described in further detail hereinafter in connection with FIGS. 4 and 5. Robotic control operations for control of motor 112/208, drill string 104, and drill bit 102 using reward policy 302 and the recommended values from prediction engine 304 are described in further detail hereinafter in connection with FIGS. 6 and 7. Reinforcement learning operations for generating of reward policy 302 using the recommended values from prediction engine 304 and measured values from drilling system 101 are described in further detail hereinafter in connection with FIGS. 8 and 9.

During a drilling operation, drilling fluids are pumped into the wellbore to remove the cuttings produced while the drill bit penetrates subsurface rock layers and forms the wellbore within the subsurface formation. The major physical and engineering aspects of the drilling process can be very complex and any wellsite data collected as the wellbore is drilled often includes a significant amount of noise and uncertainty. As a result, the actual ROP resulting from a WOB and RPM setting intended to produce a particular desired ROP, may be different from the particular desired ROP (e.g., in a non-linear and discontinuous manner).

Accordingly, prediction engine 301 and robotic controller 300 are arranged to cooperate to determine and achieve a desired ROP by continually or periodically adjusting the WOB and RPM of the drill bit using a model and a machine-learned reward policy.

In accordance with various aspects, prediction engine 301 may use a neural network model with stochastic optimization to generate recommended (e.g., optimized) values for the ROP, and for the controllable parameters (e.g., the WOB and RPM) of the drilling operation that affect the ROP. These stochastic optimizations may help facilitate real-time control of ROP during drilling in a localized region of the formation over each stage of the drilling operation. An example of a neural network model with stochastic optimization is shown in FIG. 4.

Figure 4:
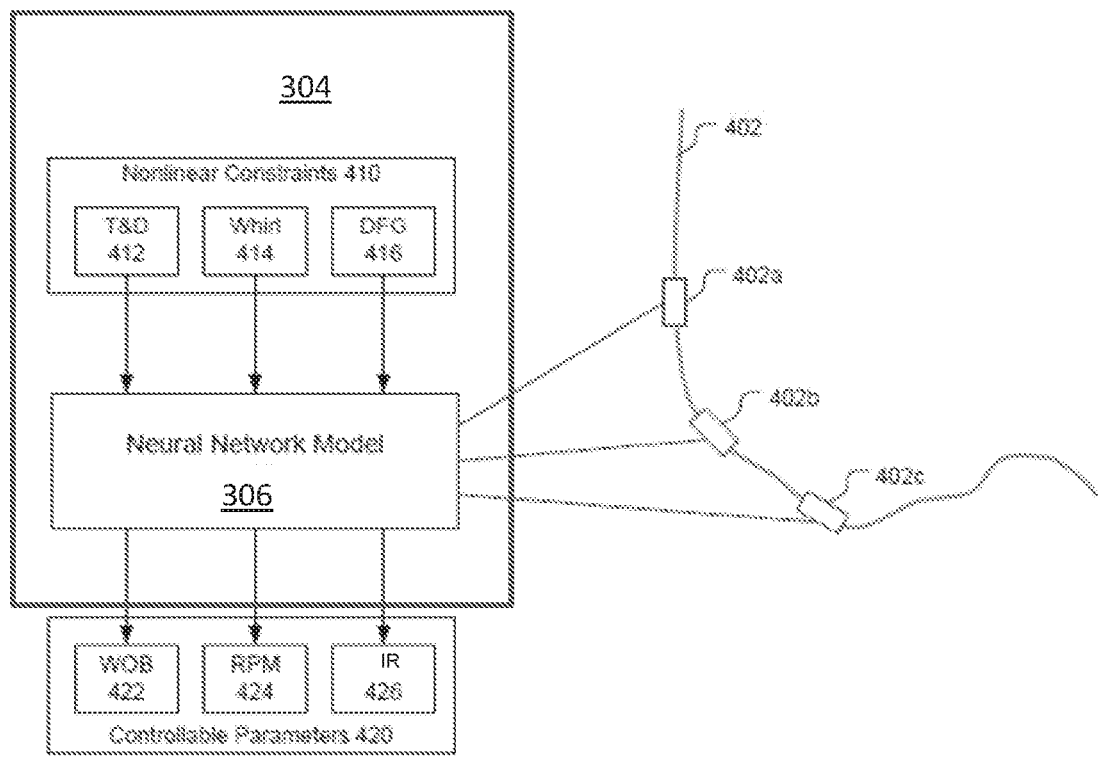
FIG. 4 is a diagram of an illustrative neural network model for optimizing parameters for a drilling operation along a planned well path based on non-linear constraints applied to the model over different stages of the operation in accordance with some implementations e.

In the example of FIG. 4, model 306 is implemented as neural network model with stochastic optimization to optimize at least one operating variable (e.g., to maximize ROP) at each of a plurality of stages 402a, 402b, and 402c of a drilling operation along a well path 402 (e.g., a well path corresponding to borehole 108 of FIG. 1 or FIG. 2). Each stage may correspond to an interval or section of well path 402 along which a portion of a wellbore is drilled through a subsurface formation. While three stages are shown in FIG. 4, it should be appreciated that the drilling operation may include any number of stages. It should also be appreciated that each stage of the operation may be of any length or size and that the overall spacing of the stages along well path 402 may be customized or configured as desired for a particular implementation.

For example, in some implementations, each stage of the drilling operation may be performed over a predetermined length or depth interval (e.g., 30 feet) along the well path and the stages may be located adjacently to one another. As another example, adjustment of WOB, RPM, and/or IR can be performed continuously during drilling along well path 402 based on continuous updates to these parameters by robotic controller 300.

While the drilling operation is performed along well path 402, a robotic controller 300 may adjust the values of one or more controllable parameters, e.g., WOB, RPM, and IR, to account for changes in drilling conditions. The value of an operating variable such as the ROP may also change in response to the changes made to the controllable parameters. Accordingly, the operating variable in this context may be referred to as a response variable and a value of the operating variable as a response value. Real-time data including current values of the controllable parameters and response values may be collected at the wellsite during drilling (e.g., during each of stages 402a, 402b, and 402c). The real-time data may be multidimensional temporal data, e.g., drilling data samples captured with depth over a time series, which may correspond to the drilling rate. Neural network model 306 may be used to couple the depth data with nonlinear constraints to resolve the time and spatial variation of the response variable during the drilling operation.

The values of the controllable parameters associated with a current stage (e.g., 402a) of the drilling operation may be applied as input variables for training neural network model 306 to produce an objective function defining a response value for the operating variable to be optimized for a subsequent stage (e.g., 402b and/or 402c) of the operation. For example, the objective function may define a response value for ROP in terms of WOB, RPM, and/or IR, as expressed using Equation (1):

$$ROP=f(WOB,RPM,IR). \quad (1)$$

The objective function in this context may be a cost function, which can be maximized or minimized depending on the particular operating variable of interest (e.g., maximized for ROP or minimized for another operating variable such as mechanical specific energy (MSE) or hydraulic mechanical specific energy (HMSE)).

To account for nonlinearity and/or noise in the real-time or drilling rate time series data (e.g., from sensors 309), the objective function generated by neural network model 306 for defining the response value of the operating variable may be subject to a set of nonlinear constraints 410. Nonlinear constraints 410 may be derived from data models representing different aspects of the drilling operation that may be associated with certain values of the controllable parameters and that may impact the response value of the operating variable to change over the course of the drilling operation. The data models in this example may include, but are not limited to, a torque and drag ("T&D") model 412, a whirl model 414, and a drilling fluid model ("DFM") 416.

Appropriate constraints may be obtained by applying the real-time data acquired during the drilling operation as inputs to each of these models. For example, torque and drag model 412 may be used to simulate forces exerted on the drill bit by friction with the subterranean formation in which the wellbore is being formed. Torque and drag model 412 may therefore provide a threshold on the WOB to avoid excessive wear that can lead to failure of the drill bit or other components of the drilling assembly attached to the end of the drill string. Whirl model 414 may be used to simulate vibrational forces in the drill string that may cause damage at certain RPM values. As RPM values can change with the length and depth of the drill string, whirl model 414 may be used to constrain the RPM to safe value ranges that avoid excess vibration at a given WOB. Drilling fluid model 416 may be used to simulate the injection of drilling fluid (e.g., mud) used to remove cuttings or debris from the wellbore during the drilling operation. The ROP of the drill bit may be limited by the maximum amount of debris that can be removed from the wellbore by fluid injection or pumping over a given period of time. Thus, drilling fluid model 416 may provide a maximum fluid injection or pumping rate at which debris-filled fluid can be removed from the wellbore.

Neural network model 306 with the constraints applied to the objective function, as described above, may then be used to estimate or predict a response value for the operating variable to be optimized for a subsequent stage of the drilling operation along well path 402. In one or more embodiments, stochastic optimization (e.g., Bayesian optimization) may be applied to the response value to produce a recommended (e.g., optimized) response value, corresponding to a recommended (e.g., optimized) ROP, and/or one or more recommended (e.g., optimized) controllable parameters values 420 such as recommended values for the WOB (e.g., an optimized WOB 422), RPM (e.g., an optimized RPM 424), and/or IR (e.g., an optimized IR 426) for a recommended ROP (e.g., the recommended values of WOB, RPM, and/or IR expected to cause a recommended ROP) based on the model.

Figure 5:
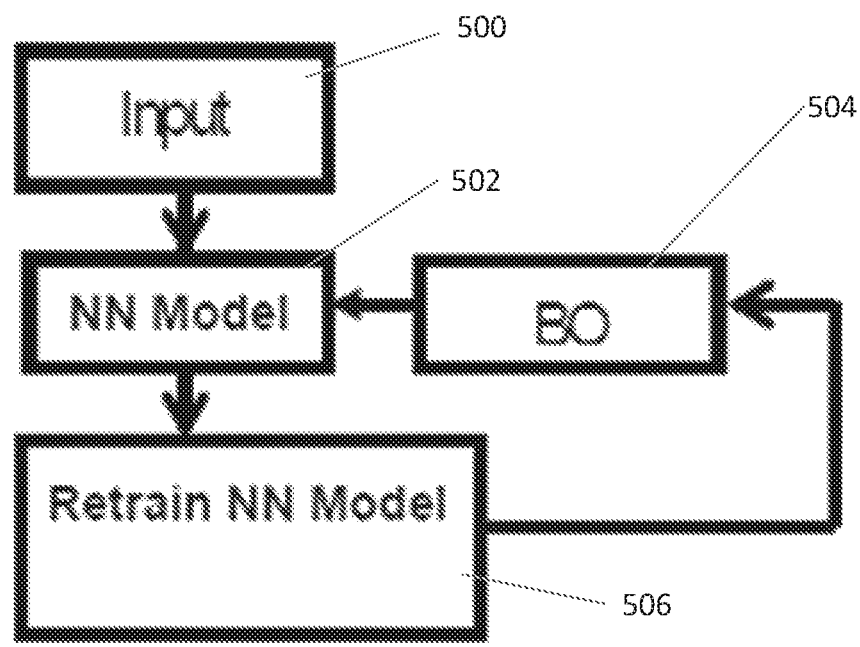
FIG. 5 is a schematic of a neural network model with real-time data inputs and Bayesian optimization for training or retraining the model in accordance with some implementations.

As shown in FIG. 5, Bayesian optimization (BO) may be applied iteratively to retrain a model 306 such as a neural network model 502 to meet a predetermined criterion based on inputs 500 such as downhole and/or surface sensor data. Such a criterion may be, for example, an error tolerance threshold, and the neural network model may be retrained (506) each time it is determined that a difference between the estimated response value and an actual value of the operating variable exceeds the threshold. The actual value of the operating variable may be based on additional real-time data acquired during a subsequent stage of the drilling operation.

The neural network model may be retrained (506) by applying the Bayesian optimization (504, e.g., by optimization engine 308) to one or more hyperparameters of the model. Examples of such hyperparameters include, but are not limited to, the number of layers of the neural network, the number of nodes in each layer, the learning rate of decay and any other parameter that relates to the behavior and/or capacity of the model. The neural network model used by drilling optimizer 314 to estimate the response value of the operating variable and values of the controllable parameters, as described above, may be at least one of a sliding window neural network (SWNN) or a recurrent deep neural network (DNN).

The recommended WOB, RPM, and/or IR can be applied to drilling components 303 by controller 300 to achieve a desire ROP (e.g., the recommended ROP). However, it some scenarios, environmental features of the formation, the drilling system, or other environmental factors that are unknown to model 306 can cause the resulting (actual) ROP to differ from the recommended (e.g., optimized) ROP, when the recommended WOB, RPM, and/or IR are applied.

However, reward policy 302 encapsulates machined-learned actions that can overcome these unknown environmental variables, based on the learning process previously performed by reinforcement learning engine 310, to achieve a desired ROP.

Figure 6:
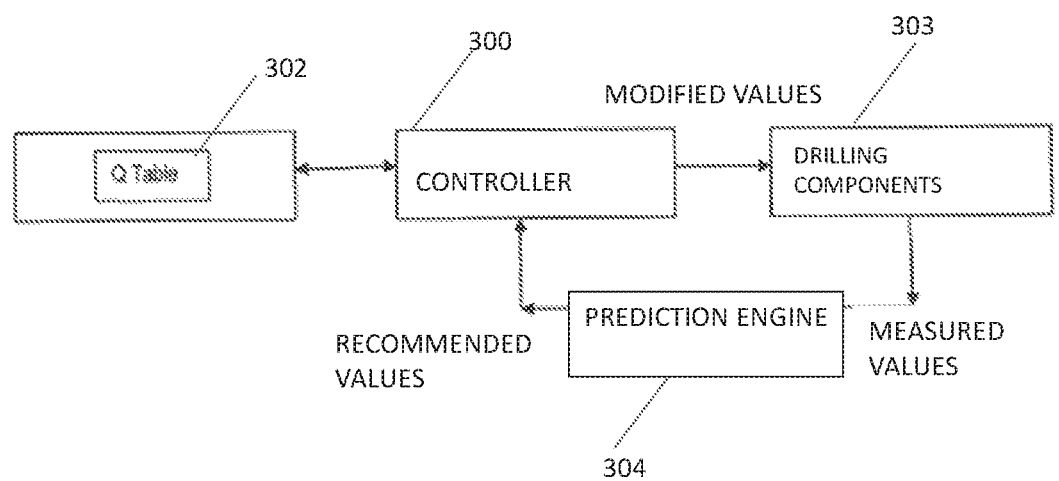
FIG. 6 is a schematic flow diagram showing example data exchanges for drilling control using a machine-learned reward policy in accordance with some implementations.

FIG. 6 is a flow diagram illustrating data flows for operating drilling system 101 using reward policy 302. In the example of FIG. 6, reward policy 302 is implemented as a Q-table, resulting from a reinforcement learning process (e.g., a Q-learning process) performed by reinforcement learning engine 310, and containing values that provide a maximum reward for each of several possible actions that can be applied to drilling components 303 (as described in further detail hereinafter in connection with FIGS. 8 and 9). In another example, reward policy 302 may be implemented as a machine learning model such as a deep neural network (DNN) resulting from a reinforcement learning process performed by reinforcement learning engine 310, and trained to generate values that provide a maximum reward for each of several possible actions that can be applied to drilling components 303.

As shown in FIG. 6, measured values such as measured values of ROP, WOB, RPM, and IR are obtained by drilling components 303 (e.g., using known applied values and/or using sensors 309) and provided to prediction engine 304. Prediction engine 304 generates, using the measured values and model 306 with optimization engine 308, recommended (e.g., optimized) values of ROP, WOB, RPM, and IR that are provided to robotic controller 300 (e.g., as described above in connection with FIGS. 4 and 5). Robotic controller 300 obtains, using reward policy 302 and the recommended values, modified values of WOB, RPM, and IR to be applied to drilling components 303 to achieve the recommended ROP. For example, robotic controller 300 may obtain one or more actions for each of the WOB, RPM, and/or IR to be performed to achieve the recommended ROP such as actions to increase the WOB, RPM, and/or IR by 10%, 20%, 30%, 40%, or another percentage or amount, actions to decrease the WOB, RPM, and/or IR by 10%, 20%, 30%, 40%, or another percentage or amount, or actions to maintain the current WOB, RPM, and/or IR. The modified values are then applied to drilling components 303 (e.g., by performing the action obtained from the Q-table).

Figure 7:
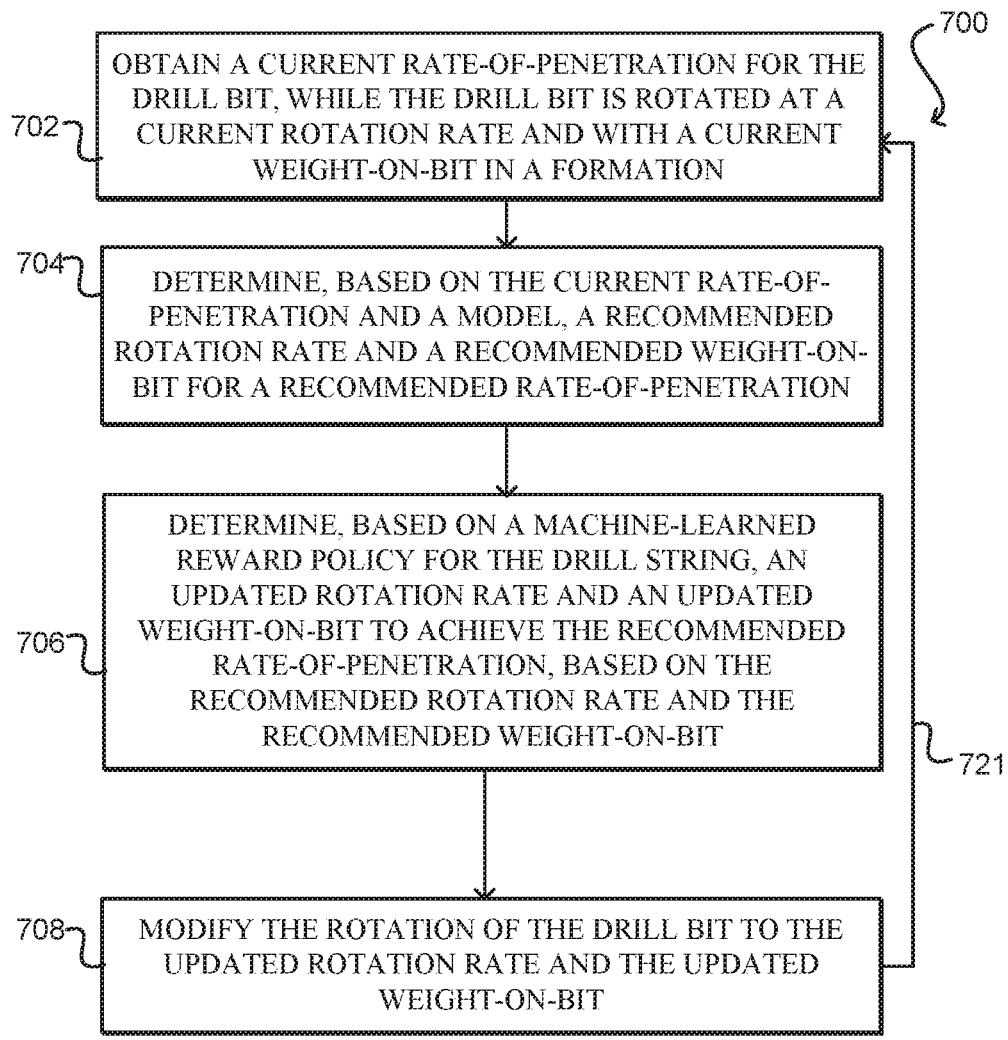
FIG. 7 illustrates a flow chart of illustrative operations that may be performed for controlling drilling operations using a machine-learned reward policy in accordance with some implementations.

FIG. 7 illustrates an example flowchart of a process 700 for robotic control of a drilling system in accordance with some implementations. Although FIG. 7, as well as other process illustrations contained in this disclosure may depict functional steps or operations in a particular sequence, the processes are not necessarily limited to the particular order or steps illustrated. The various steps and/or operations portrayed in this or other figures can be changed, rearranged, performed in parallel or adapted in various ways. Furthermore, it is to be understood that certain steps or sequences of steps can be added to or omitted from the process, without departing from the scope of the various implementations. The process 700 may be implemented by one or more computing devices or systems in some implementations, such as one or more of computing systems 140, 142, 240, and/or 242 described above in connection with FIGS. 1 and 2, a computing device 1000 described in FIG. 10, and/or client device 1102 or server 1106 described in FIG. 11.

At block 702, a current rate-of-penetration (ROP) for a drill bit such as drill bit 102 is obtained (e.g., by prediction engine 304 using sensors 309), while the drill bit is rotated at a current rotation rate (RPM) and with a current weight-on-bit (WOB) in a formation 122. The current rotation rate (RPM) and current weight-on-bit (WOB) may be known applied values or measured values.

At block 704, based on the current rate-of-penetration and a model such as model 306, a recommended rotation rate and a recommended weight-on-bit are determined for a recommended rate-of-penetration (e.g., by prediction engine 304). The recommended rate-of-penetration may be determined (e.g., by prediction engine 304) in the same operation in which the recommended rotation rate and a recommended weight-on-bit are determined. The model may be a neural network model (e.g., as described above in connection with FIGS. 4 and 5). Determining the recommended rotation rate and the recommended weight-on-bit may include determining the recommended rotation rate and the recommended weight-on-bit based on the neural network model and a Bayesian optimization operation (e.g., using optimization engine 308 as described above in connection with FIGS. 4 and 5).

At block 706, with a machine-learned reward policy such as reward policy 302, an updated rotation rate and an updated weight-on-bit are determined, to achieve the recommended rate-of-penetration, based on the recommended rotation rate and the recommended weight-on-bit. Determining the updated rotation rate and an updated weight-on-bit may include determining a modified rotation rate and a modified weight-on-bit based on reward-based actions in a table corresponding to the machine-learned reward policy. The machine-learned reward policy may be a Q-table that has been generated with a reinforcement learning process for the drill string, as described herein. The reinforcement learning process is described in further detail hereinafter and includes comparisons of previous actual rates-of-penetration with previous recommended rates-of-penetration evaluated prior to obtaining the current rate-of-penetration. Each of the comparisons includes an evaluation of a reward function, as described herein.

The recommended WOB and RPM can be modified in unison (e.g., by a common percentage such as a common increase or decrease of both operational parameters by 10%) or differently (e.g., by modifying the recommended rotation rate with a 10% increase and the recommended WOB with a 20% increase or a decrease) to generate the updated WOB and the updated RPM, based on the machine-learned reward policy. In some scenarios, the recommended WOB is modified using the machine-learned reward policy to generate an updated WOB that is different from the recommended WOB, without modifying the recommended RPM (e.g., the updated RPM is the same as the recommended RPM). In some scenarios, the recommended RPM is modified using the machine-learned reward policy to generate an updated RPM that is different from the recommended RPM, without modifying the recommended WOB (e.g., the updated WOB is the same as the recommended WOB).

At block 708, the current rotation rate and the current weight-on-bit of the drill bit may be modified to the updated rotation rate and the updated weight-on-bit. As indicated by arrow 721, the operations of blocks 702-708 may be repeated periodically or continuously during a drilling operation to help ensure that a desired ROP is known and achieved.

Robotic controller 300 may directly control drilling components 303 to modify WOB, RPM, and/or IR without human intervention, may provide an operator with an opportunity or requirement to accept the modifications before they are applied, and/or may provide the modified values of WOB, RPM, and/or IR to an operator for operator implementation.

Figure 8:
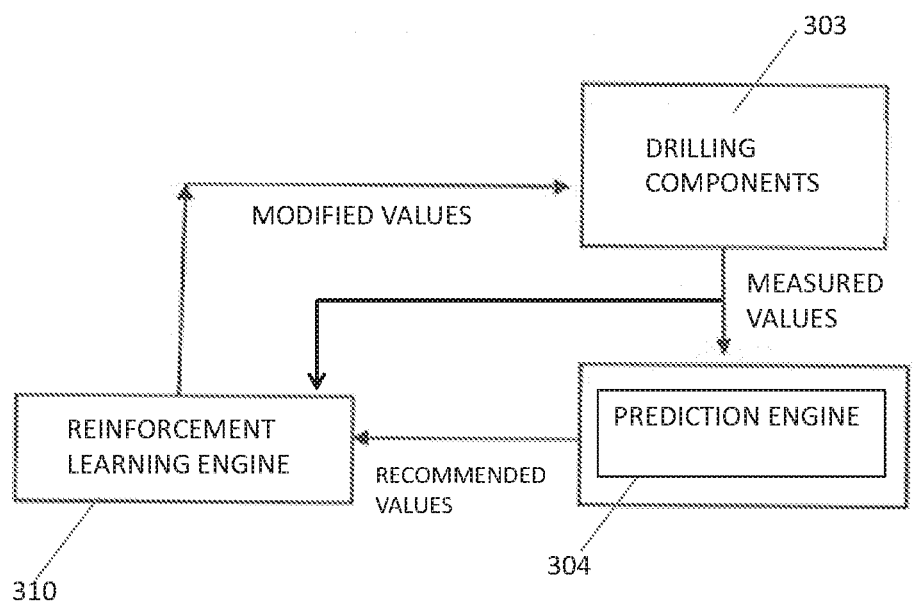
FIG. 8 is a schematic flow diagram showing example data exchanges for generating a machine-learned reward policy using reinforcement learning in accordance with some implementations.

FIG. 8 is a flow diagram illustrating data flows for performing a reinforcement learning operation to generate reward policy 302. In the example of FIG. 8, measured values such as measured values of ROP, WOB, RPM, and IR are obtained by drilling components 303 (e.g., using known applied values and/or using sensors 309) and provided to both prediction engine 304 and reinforcement learning engine 310.

Prediction engine 304 generates, using the measured values and model 306 with optimization engine 308, recommended (e.g., optimized) values of ROP, WOB, RPM, and IR that are provided to reinforcement learning engine 310. Reinforcement learning engine 310 compares the recommended ROP to the measured (actual) ROP to determine a reward value. Performing the comparison of the recommended ROP ($ROP_{rec}$) to the measured (actual) ROP ($ROP_{act}$) may, for example, include evaluating a reward function such as the reward function shown in Equation (2) below:

$$\text{reward} = \frac{1}{1 + (ROP_{rec} - ROP_{act})^2}. \quad (2)$$

The computed reward may be used to begin populating the machine-learned reward policy 302. For example, if the recommended ROP is not the same as the actual ROP, reinforcement learning engine 310 may select an action to change the WOB, RPM, and/or IR of the drilling system. When the action is selected, modified values of the WOB, RPM, and/or IR are provided to drilling components 303 and applied, and a new evaluation of the reward function is performed. Accordingly, reward values for each possible action are generated for population of the machine-learned reward policy.

The actions performed during reinforcement learning operations may be selected based on exploration policy 312. The exploration policy 312 may be a random policy in which changes to the WOB, RPM, and/or IR are randomly selected, a deterministic policy in which changes to the WOB, RPM, and/or IR are selected based on a measured relative error in the ROP, or another policy such as an epsilon greedy policy in which the actions are selected based on a combination of random and deterministic choices.

The relative error "Err" in the ROP may be determined using Equation (3) below:

$$Err = \frac{(ROP_{act} - ROP_{rec})}{ROP_{rec}}. \quad (3)$$

In a deterministic implementation of exploration policy 312, if the relative error determined with Equation (2) is negative, the WOB and/or ROP are increased (e.g., by a common ten percent or other amount(s)), if the relative error determined with Equation (2) is positive, the WOB and/or ROP are decreased (e.g., by a common ten percent or other amount(s)), or if the relative error is substantially zero, no action may be taken (e.g., until a new recommended ROP is generated and provided by prediction engine 304).

In an epsilon greedy policy, a random number (e.g., a pseudo-random number between zero and one) may be selected and, if the random number is greater than epsilon (which may be a small constant number such as 0.1), the deterministic approach above is used to select the next action, or if the random number is less than epsilon an action is randomly selected.

Once the reward policy 302 is generated (e.g., a Q-table is stored in memory accessible by controller 300), controller 300 obtains, using reward policy 302 and the recommended values, modified values of WOB, RPM, and IR to be applied to drilling components 303 to achieve a recommended ROP. For example, robotic controller 300 may obtain one or more actions from Q-table 302 for each of WOB, RPM, and/or IR to be performed to achieve the recommended ROP, such as actions to increase the WOB, RPM, and/or IR by 10%, 20%, 30%, 40%, or another percentage or amount, actions to decrease the WOB, RPM, and/or IR by 10%, 20%, 30%, 40%, or another percentage or amount, or actions to maintain the current WOB, RPM, and/or IR. The modified values are then applied to drilling components 303 (e.g., by performing the action obtained from the Q-table).

Figure 9:
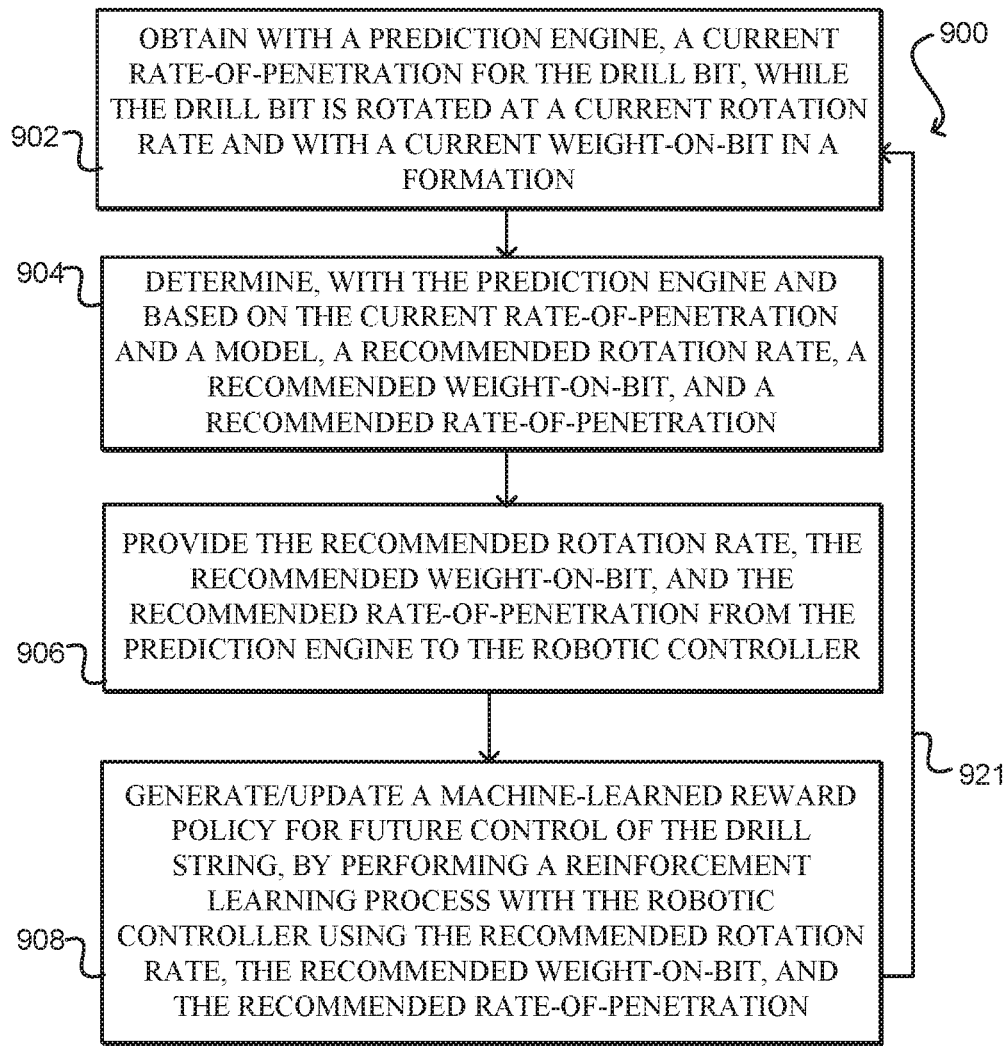
FIG. 9 illustrates a flow chart of illustrative operations that may be performed for generating a machine-learned reward policy using reinforcement learning in accordance with some implementations.

FIG. 9 illustrates an example flowchart of a process 900 for reinforcement learning for robotic control of a drilling system in accordance with some implementations. Although FIG. 9, as well as other process illustrations contained in this disclosure may depict functional steps or operations in a particular sequence, the processes are not necessarily limited to the particular order or steps illustrated. The various steps and/or operations portrayed in this or other figures can be changed, rearranged, performed in parallel or adapted in various ways. Furthermore, it is to be understood that certain steps or sequences of steps can be added to or omitted from the process, without departing from the scope of the various implementations. The process 900 may be implemented by one or more computing devices or systems in some implementations, such as one or more of computing systems 140, 142, 240, and/or 242 described above in connection with FIGS. 1 and 2, a computing device 1000 described in FIG. 10, and/or client device 1102 or server 1106 described in FIG. 11.

At block 902, prediction engine 304 may be used to obtain a current rate-of-penetration for a drill bit 102 (e.g., using known applied values and/or from sensors 309), while the drill bit is rotated at a current rotation rate (RPM) and with a current weight-on-bit (WOB) in a formation.

At block 904, the prediction engine determines, based on the current rate-of-penetration and a model such a model 306, a recommended rotation rate, a recommended weight-on-bit, and a recommended rate-of-penetration (see, e.g., FIGS. 4 and 5).

At block 906, the prediction engine provides the recommended rotation rate, the recommended weight-on-bit, and the recommended rate-of-penetration to a controller such as robotic controller 300.

At block 908, a machine-learned reward policy for future control of the drill string is generated, by performing a reinforcement learning process with the robotic controller using the recommended rotation rate, the recommended weight-on-bit, and the recommended rate-of-penetration. The reinforcement learning process includes applying a plurality of modifications to the recommended rotation rate and the recommended weight-on-bit. The reinforcement learning process also includes, for each modification, obtaining a new current rate-of-penetration and evaluating a reward function (see, e.g., Equation (2)) that compares the new current rate-of-penetration to the recommended rate of penetration.

The machine-learned reward policy may, for example, be a reward table (e.g., a Q-table as described herein). Performing the reinforcement learning process includes populating the reward table based on each evaluation of the reward function. Each of the plurality of modifications may be determined using an exploration policy such as exploration policy 312 (e.g., an epsilon greedy policy or other policy) of the reinforcement learning process. The operations described above in connection with blocks 902-908 may be repeated (e.g., for 100 episodes, each corresponding to a new recommended ROP from prediction engine 304)) to generate policy 302.

For example, prediction engine 304 may generate a new current rate-of-penetration for the drill bit, while the drill bit is rotated at a new current rotation rate and with a new current weight-on-bit in a formation. The new current rotation rate and the new current weight-on-bit may be previous modified values provided by robotic controller 300 based on new or partially populated reward policy. Prediction engine 304 may then, based on the new current rate-of-penetration and the model, determine a new recommended rotation rate, a new recommended weight-on-bit, and a new recommended rate-of-penetration and provide the new recommended rotation rate, the new recommended weight-on-bit, and the new recommended rate-of-penetration to the robotic controller. The robotic controller may then update the machine-learned reward policy for future control of the drill string, by performing the reinforcement learning process with the robotic controller using the new recommended rotation rate, the new recommended weight-on-bit, and the new recommended rate-of-penetration and new evaluations of the reward function. In this way, a robotic controller 300 for a drill string 104 and associated drill bit 102 of a drilling components 303 may be configured (e.g., for improved drilling operations) by performing some or all of the operations described above in connection with blocks 902-908.

Figure 10:
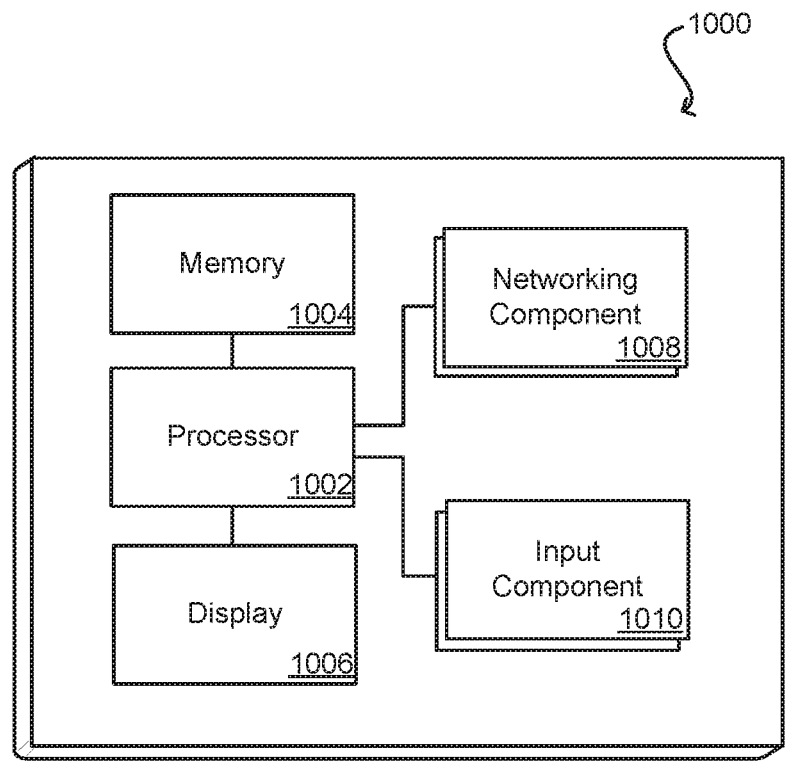
FIG. 10 illustrates a schematic diagram of a set of general components of an example computing device in accordance with some implementations.

FIG. 10 illustrates a schematic diagram of a set of general components of an example computing device 1000 (e.g., an implementation of computing system 140, 142, 240, or 242 described herein). In this example, the computing device 1000 includes a processor 1002 for executing instructions that can be stored in a memory device or element 1004. The computing device 1000 can include many types of memory, data storage, or non-transitory computer-readable storage media, such as a first data storage for program instructions for execution by the processor 1002, a separate storage for images or data, a removable memory for sharing information with other devices, etc.

The computing device 1000 typically may include a display element 1006, such as a touch screen or liquid crystal display (LCD). As discussed, the computing device 1000 in many embodiments will include at least one input element 1010 able to receive conventional input from a user. This conventional input can include, for example, a push button, touch pad, touch screen, wheel, joystick, keyboard, mouse, keypad, or any other such device or element whereby a user can input a command to the device. In some embodiments, however, such the computing device 1000 might not include any buttons at all, and might be controlled only through a combination of visual and audio commands, such that a user can control the computing device 1000 without having to be in contact with the computing device 1000. In some embodiments, the computing device 1000 of FIG. 10 can include one or more network interface elements 1008 for communicating over various networks, such as a Wi-Fi, Bluetooth, RF, wired, or wireless communication systems. The computing device 1000 in many embodiments can communicate with a network, such as the Internet, and may be able to communicate with other such computing devices.

Figure 11:
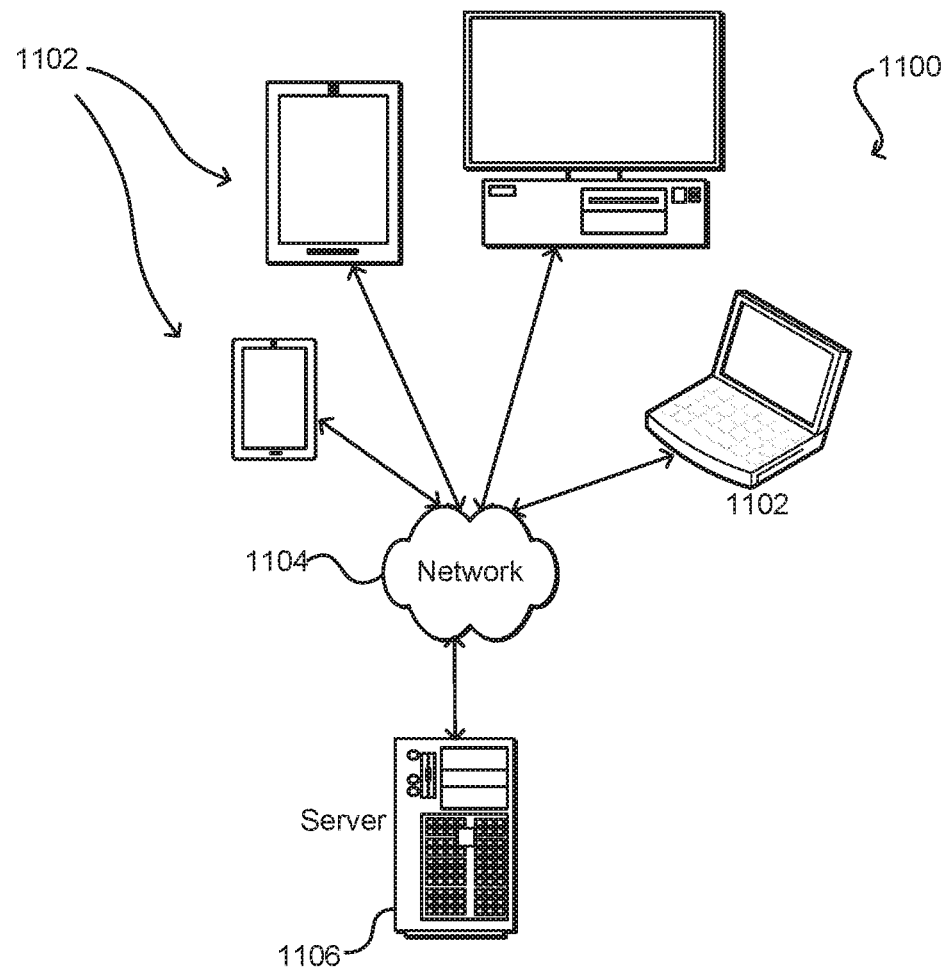
FIG. 11 illustrates a schematic diagram of an example of an environment for implementing aspects in accordance with some implementations.

As discussed herein, different approaches can be implemented in various environments in accordance with the described embodiments. For example, FIG. 11 illustrates a schematic diagram of an example of an environment 1100 for implementing aspects in accordance with various embodiments. As will be appreciated, although a client-server based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, and the like.

The network 1104 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Computing over the network 1104 can be enabled via wired or wireless connections and combinations thereof. In this example, the network includes the Internet, as the environment includes a server 1106 for receiving requests and serving content in response thereto, although for other networks, an alternative device serving a similar purpose could be used, as would be apparent to one of ordinary skill in the art.

The client device 1102 may represent the computing device 1000 of FIG. 10, and the server 1106 may represent off-site computing facilities such as remote computing systems 142 or 242 described herein, in one implementation.

The server 1106 includes an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various implementations.

Various examples of aspects of the disclosure are described below as clauses for convenience. These are provided as examples, and do not limit the subject technology.

Clause A. A method of controlling a drill string having a drill bit, the method comprising: obtaining a current rate-of-penetration for the drill bit, while the drill bit is rotated at a current rotation rate and with a current weight-on-bit in a formation; determining, determining, with a machine-learned reward policy for the drill string, an updated rotation rate and an updated weight-on-bit to achieve the recommended rate-of-penetration, based on the recommended rotation rate and the recommended weight-on-bit; and modifying the current rotation rate and the current weight-on-bit of the drill bit to the updated rotation rate and the updated weight-on-bit.

Clause B. A control system for drilling system having a drill sting operatively coupled to a drill bit, the control system comprising: at least one processor; and memory comprising instructions that, when executed cause the at least one processor to: obtain a current rate-of-penetration for the drill bit, while the drill bit is rotated at a current rotation rate and with a current weight-on-bit in a formation; determine, based on the current rate-of-penetration and a model, a recommended rotation rate and a recommended weight-on-bit for a recommended rate-of-penetration; determine, determine an updated rotation rate and an updated weight-on-bit to achieve the recommended rate-of-penetration, based on a machine-learned reward policy, the recommended rotation rate and the recommended weight-on-bit; and modify the current rotation rate and the current weight-on-bit of the drill bit to the updated rotation rate and the updated weight-on-bit.

Clause C. A method of configuring a robotic controller for a drill string and associated drill bit of a drilling system, the method comprising: obtaining, with a prediction engine, a current rate-of-penetration for the drill bit, while the drill bit is rotated at a current rotation rate and with a current weight-on-bit in a formation; determining, with the prediction engine and based on the current rate-of-penetration and a model, a recommended rotation rate, a recommended weight-on-bit, and a recommended rate-of-penetration; providing the recommended rotation rate, the recommended weight-on-bit, and the recommended rate-of-penetration from the prediction engine to the robotic controller; and generating a machine-learned reward policy for future control of the drill string, by performing a reinforcement learning process with the robotic controller using the recommended rotation rate, the recommended weight-on-bit, and the recommended rate-of-penetration.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method of controlling a drill string having a drill bit, the method comprising:
    obtaining a current rate-of-penetration for the drill bit, while the drill bit is rotated at a current rotation rate and with a current weight-on-bit in a formation;
    determining, based on the current rate-of-penetration and a model, a recommended rotation rate and a recommended weight-on-bit for a recommended rate-of-penetration;
    determining, with a machine-learned reward policy for the drill string, an updated rotation rate and an updated weight-on-bit to achieve the recommended rate-of-penetration, based on the recommended rotation rate and the recommended weight-on-bit; and
    modifying the current rotation rate and the current weight-on-bit of the drill bit to the updated rotation rate and the updated weight-on-bit.

2. The method of claim 1, wherein the updated rotation rate is different from the recommended rotation rate.

3. The method of claim 1, wherein the updated weight-on-bit is different from the recommended weight-on-bit.

4. The method of claim 3, wherein the updated rotation rate is different from the recommended rotation rate.

5. The method of claim 1, wherein the machine-learned reward policy comprises at least one of a Q-table or a machine learning model generated with a reinforcement learning process for the drill string.

6. The method of claim 5, wherein the reinforcement learning process comprises comparisons of previous actual rates-of-penetration with previous recommended rates-of-penetration evaluated prior to obtaining the current rate-of-penetration.

7. The method of claim 6, wherein each of the comparisons comprises an evaluation of a reward function.

8. The method of claim 1, wherein the model comprises a neural network model and wherein determining the recommended rotation rate and the recommended weight-on-bit comprises determining the recommended rotation rate and the recommended weight-on-bit based on the neural network model and a Bayesian optimization operation.

9. A control system for drilling system having a drill sting operatively coupled to a drill bit, the control system comprising:
    at least one processor; and
    memory comprising instructions that, when executed cause the at least one processor to:
    obtain a current rate-of-penetration for the drill bit, while the drill bit is rotated at a current rotation rate and with a current weight-on-bit in a formation;
    determine, based on the current rate-of-penetration and a model, a recommended rotation rate and a recommended weight-on-bit for a recommended rate-of-penetration;
    determine an updated rotation rate and an updated weight-on-bit to achieve the recommended rate-of-penetration, based on a machine-learned reward policy, the recommended rotation rate and the recommended weight-on-bit; and
    modify the current rotation rate and the current weight-on-bit of the drill bit to the updated rotation rate and the updated weight-on-bit.

10. The control system of claim 9, wherein the updated weight-on-bit is different from the recommended weight-on-bit.

11. The control system of claim 10, wherein the updated rotation rate is different from the recommended rotation rate.

12. The control system of claim 9, wherein the machine-learned reward policy comprises at least one of a Q-table or a machine learning model generated with a reinforcement learning process for the drill string.

13. The control system of claim 12, wherein the reinforcement learning process comprises comparisons of previous actual rates-of-penetration with previous recommended rates-of-penetration evaluated prior to obtaining the current rate-of-penetration.

14. The control system of claim 13, wherein each of the comparisons comprises an evaluation of a reward function.

15. The control system of claim 9, wherein the model comprises a neural network model and wherein the at least one processor is configured to determine the recommended rotation rate and the recommended weight-on-bit by determining the recommended rotation rate and the recommended weight-on-bit based on the neural network model and a Bayesian optimization operation.

16. A method of configuring a robotic controller for a drill string and associated drill bit of a drilling system, the method comprising:
    obtaining, with a prediction engine, a current rate-of-penetration for the drill bit, while the drill bit is rotated at a current rotation rate and with a current weight-on-bit in a formation;
    determining, with the prediction engine and based on the current rate-of-penetration and a model, a recommended rotation rate, a recommended weight-on-bit, and a recommended rate-of-penetration;
    providing the recommended rotation rate, the recommended weight-on-bit, and the recommended rate-of-penetration from the prediction engine to the robotic controller; and
    generating a machine-learned reward policy for future control of the drill string, by performing a reinforcement learning process with the robotic controller using the recommended rotation rate, the recommended weight-on-bit, and the recommended rate-of-penetration.

17. The method of claim 16, wherein performing the reinforcement learning process comprises:
    applying a plurality of modifications to the recommended rotation rate and the recommended weight-on-bit; and for each modification:
        obtaining a new current rate-of-penetration; and
        evaluating a reward function that compares the new current rate-of-penetration to the recommended rate-of-penetration.

18. The method of claim 17, wherein the machine-learned reward policy comprises a reward table, and wherein performing the reinforcement learning process further comprises populating the reward table based on each evaluation of the reward function.

19. The method of claim 17, further comprising determining each of the plurality of modifications using an epsilon greedy policy of the reinforcement learning process.

20. The method of claim 16, further comprising:
    obtaining, with the prediction engine, a new current rate-of-penetration for the drill bit, while the drill bit is rotated at a new current rotation rate and with a new current weight-on-bit in a formation;

determining, with the prediction engine and based on the new current rate-of-penetration and the model, a new recommended rotation rate, a new recommended weight-on-bit, and a new recommended rate-of-penetration;

providing the new recommended rotation rate, the new recommended weight-on-bit, and the new recommended rate-of-penetration from the prediction engine to the robotic controller; and updating the machine-learned reward policy for future control of the drill string, by performing the reinforcement learning process with the robotic controller using the new recommended rotation rate, the new recommended weight-on-bit, and the new recommended rate-of-penetration.

* * * * *